(12) United States Patent
Ijuin et al.

(10) Patent No.: US 6,530,693 B1
(45) Date of Patent: Mar. 11, 2003

(54) CYLINDRICAL ROLLER BEARING

(75) Inventors: Seiji Ijuin, Fujisawa (JP); Takashi Yamamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/678,833

(22) Filed: Oct. 4, 2000

(51) Int. Cl.$^7$ .............................................. F16C 33/58
(52) U.S. Cl. ........................ 384/450; 384/564; 384/565
(58) Field of Search ............................... 384/564, 565, 384/571, 450, 568

(56) References Cited

U.S. PATENT DOCUMENTS 6,033,123 A * 3/2000 Sato et al. .................. 384/571

* cited by examiner

Primary Examiner—Lenard A. Footland
(74) Attorney, Agent, or Firm—Crowell & Moring LLP

(57) ABSTRACT

A cylindrical roller bearing wherein the end surface of the rollers comes in contact with the guiding surface of the rib of the inner race with a contact ellipse therebetween, and at least one of the end surface and the guiding surface has a curved, convex surface, and provided that a second principal curvature plane passes through the center axis of the inner race and the center of the contact ellipse, that a first principal curvature plane perpendicularly crosses both the second principal curvature plane and the contact ellipse and extends through the center of the contact ellipse, that the cross sections of the end surface appearing in the first and second principal curvature planes have the principal radii ($Rr_2$ and $Rr_1$) of curvature, respectively, and that the cross sections of the guiding surface appearing in the first and second principal curvature planes have the proximal radii ($Rf_2$ and $Rf_1$) of curvature, respectively, the relationship between these principal radii of curvature is such that $(1/Rf_1)-(1/Rf_2)+(1/Rr_1)=(1/Rr_2)<0$.

1 Claim, 6 Drawing Sheets

CYLINDRICAL ROLLER BEARING

FIELD OF THE INVENTION

This invention relates to a cylindrical roller bearing that receives an axial load.

BACKGROUND OF THE INVENTION

The cylindrical roller bearing has races, which are an outer race and inner race, and formed with a rib, or provided with a separate guide rib adjacent it.

When the cylindrical roller bearing while it rotates receives an axial load, large friction occurs when localized stress, such as edge loading, acts in the area where the end surface of the cylindrical rollers comes in contact with the guiding surface of the rib (or guide rib) of the races. At high-speed rotation, this friction becomes evident and there is a possibility that it could promote wear and result in early damage to the bearing.

Therefore, in order that the contact stress is as uniform as possible, the opposite end surfaces of the cylindrical rollers and the guiding surface of the rib of or for the races are formed with a slight taper or curvature referred to as crowning, so that large edge loads do not occur.

For example, as disclosed in British Patent No. 1520060, crowning is performed on the guiding surface of the rib in a cylindrical roller bearing, so that the end surface of the cylindrical rollers does not come in contact with the end edge in the radial direction of the guiding surface of the rib, so that an oil film is effectively formed on the area of contact.

Also, in Japanese patent publication Jitsu Ko Sho No. 59-13369, as shown in FIG. 7, the guiding surface (Ff) of the rib, for example of the inner race (N), in a cylindrical roller bearing, is given an outward opening taper that has a certain angle ($\alpha$), and the end surface (Fr) of the roller that comes in contact with it is given a crown shape.

However, in this kind of prior art cylindrical roller bearing, although crowning is performed on the guiding surface of the rib in the bearing, or although the contact between the guiding surface of the rib of or for the inner race and the end surface of the rollers is formed such that a conical shaped outer diameter surface, that is the guiding surface of the rib of inner race, which has the apex (Ap), comes in contact with a spherical surface, that is the end surface of the rollers as shown in FIG. 7, the direction of the major axis of the contact ellipse (Ac), as shown in FIG. 8, that is formed at the area of contact between the roller and rib is in the radial direction (y) of the inner race (N) of the bearing, and depending on the size of the axial load, this contact ellipse (Ae) protrudes from the relief groove (Nm) of the guiding surface (Ff) of the rib or from the outer diameter or the guiding surface (Ff) of the rib, and there is a problem that an edge load will occur at the boundary surface between the contact ellipse (Ac) and the relief groove (Nm), or at the boundary surface between the contact ellipse (Ae) and the outer diameter of the guiding surface (Ff).

Also, when the center of the contact ellipse (Ae), which is the contact surface between the roller and the rib, is raised to the outer diameter side of the guiding surface (Ff), in order to prevent the contact ellipse (Ae) from protruding from the relief groove (Nm) of the guiding surface (Ff), sliding between the roller and rib would become large, the amount of heat generated would increase, the temperature rises in the bearing, and scuffing and seizure in the rib would occur.

SUMMARY OF THE INVENTION

In order to remove the problems, still not solved, in this kind of prior art cylindrical roller bearing, an objective of this invention is to provide a cylindrical roller bearing wherein the major axis of the contact ellipse, that is formed at the area of contact between the end surface of the cylindrical rollers and the guiding surface of the rib of or for the inner race, is directed in the circumferential direction of the inner race of the bearing, so that it is difficult for protrusion and edge loading to occur at the area of contact between the guiding surface of the rib and the end surface of the rollers when an axial load is applied to the cylindrical roller bearing.

An other objective of the present invention is to provide a cylindrical roller bearing wherein the major axis of the contact ellipse of the sliding contact area between the guiding surface of the rib of or for the inner race and the end surface of the cylindrical rollers is directed in a specified direction, so that the edge load that might occur when the contact area between the rib and the cylindrical rollers protrudes from the end surface of the rollers or from the guiding surface of the rib is reduced, thereby effectively preventing damage to the cylindrical rollers and the inner race.

DETAILED DESCRIPTION OF THE PREFERRED EMBODIMENTS

In order to accomplish the aforementioned objectives, in the cylindrical roller bearing in a first feature of the invention, at least one of the end surface of the rollers and the guiding surface of the rib of the inner race which comes in contact with the end surface of the rollers with the contact ellipse formed therebetween, has a curved, convex surface. In addition, provided that a second principal curvature plane passes through the center axis of the inner race and the center of the contact ellipse, that a first principal curvature plane perpendicularly crosses both of the second principal curvature plane and the plane of the contact ellipse and extends through the center of the contact ellipse, that the cross section of the end surface of the roller formed on the second principal curvature plane has a principal radius ($Rr_2$) of curvature while the cross section of the end surface of the rollers formed on the first principal curvature plane has a principal radius ($Rr_1$) of curvature, and that the cross sections of the guiding surface of the rib of the inner race similarly formed on the second and first principal curvature planes have the principal radii ($Rf_2$ and $Rf_1$) of curvature, respectively, the relationship between these radii of curvature is such that:

$$(1/Rf_1)-(1/Rf_2)+(1/Rr_1)-(1/Rr_2)<0$$

When there is no curvature, the radius of curvature is taken to be ∞, and $1/\infty = 0$.

The theory of the invention is explained below.

Figure 1A:
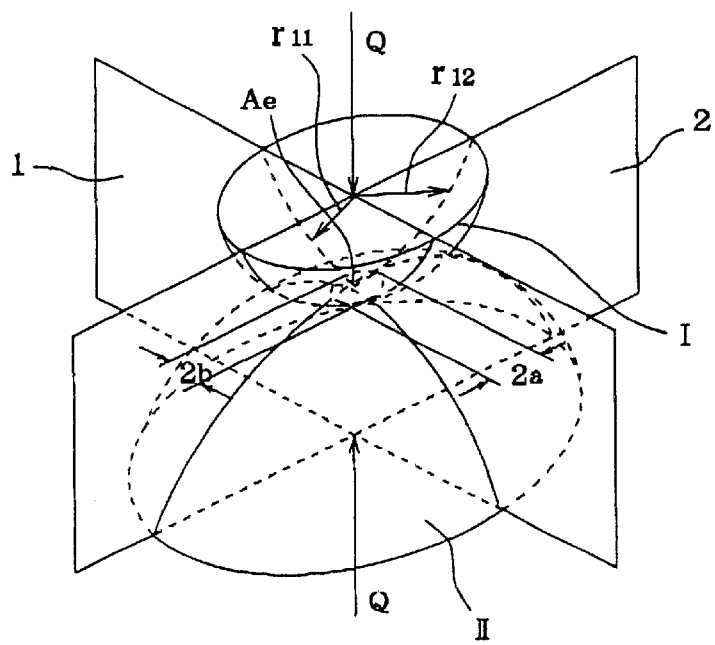
FIG. 1(A) is a perspective schematic view to explain the main curvature surface and the radius of main curvature of the point contact area between two curved surfaces.
Figure 1B:
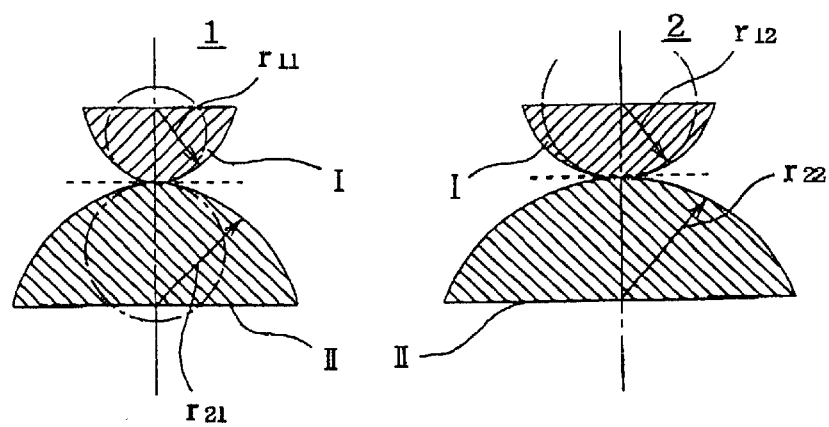
FIG. 1(B) is a cross sectional view to explain the main curvature surface and the radius of main curvature of the point contact area between two curved surfaces.

Generally, as shown in FIG. 1(A), when two elastic objects, I, II having smooth surfaces come in contact with each other, there exist first and second principal curvature planes 1 and 2 that cross each other on a symmetric plane near the contact point. Also, as shown in FIG. 1(B), in object I, there are principal radii of curvature ($r_{11}$ and $r_{12}$) in the cross-sections cut by the first and second principal curvature planes 1 and 2, respectively, and in object II there are principal radii of curvature ($r_{21}$ and $r_{22}$) in the cross-sections cut by the first and second principal curvature planes 1 and 2, respectively.

For distinction, a positive sign is given to these principal radii of curvature ($r_{11}$, $r_{12}$, $r_{21}$, $r_{22}$) for a convex surface and negative sign is given to them for a concave surface.

Here, provided that the rates of curvature, which are the inverses of these principal radii of curvature, are given by $\rho_{11}$, $\rho_{12}$, $\rho_{21}$ and $\rho_{22}$, that is $\rho_{11}=1/r_{11}$, $\rho_{12}=1/r_{12}$, $\rho_{21}=1/r_{21}$, and $\rho_{22}=1/r_{22}$, the contact ellipse (Ae), that is formed at the contact portion, has two radii orthogonal to each other with differing lengths (major radius, and minor radius), and when;

$$\rho_{11}-\rho_{12}+\rho_{21}-\rho_{22}<0 \quad (1)$$

then the major radius of the contact ellipse (Ae) is formed by the intersection of the first principal curvature plane 1 and the contact ellipse (Ae).

On the other hand, when:

$$\rho_{11}-\rho_{12}+\rho_{21}-\rho_{22}>0 \quad (2)$$

The major radius of the contact ellipse (Ae) is formed by the intersection of the second principal curvature plane 2 and the contact ellipse (Ae).

Figure 2A:
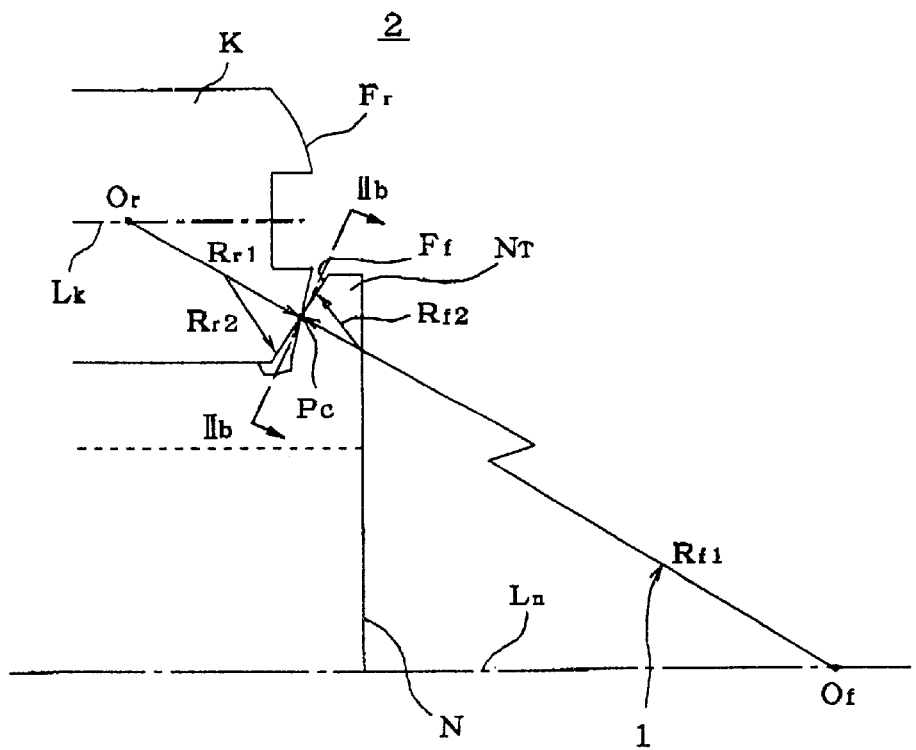
FIG. 2(A) is a vertical cross sectional schematic view to explain the relation between the shape of the contact ellipse and the curved surfaces at the contact area between the guiding surface of the rib of the inner race and the end surface of the roller in a cylindrical roller bearing.

Next, when this concept is applied to the guiding surface of the rib of the inner race and the end surface of the rollers of the cylindrical roller bearing shown in FIG. 2(A), it is as follows.

Specifically, the vertical cross section, in other word the surface of the page, which includes contact point (Pc) of the end surface (Fr) of the roller (K), that is the object I, and the guiding surface (Ff) of the rib of the inner race (N), that is the object II, and center axis (Ln) of the inner race (N), is taken to be the second principal curvature plane 2.

In addition, a plane that is perpendicular to both the second principal curvature plane 2 and the plane of the contact ellipse with the contact point (Pc) at its center, and which passes through the contact point (Pc) in the center of the contact ellipse, is taken to be the first principal curvature plane 1.

Also, with respect to the end surface (Fr) of the roller, the radius of curvature ($Rr_1$) on the first principal curvature plane 1 is taken to correspond to ($r_{11}$) in FIGS. 1(A) and 1(B) while the radius of curvature ($Rr_2$) on the second principal curvature plane 2 is taken to correspond to ($r_{12}$) in FIGS. 1(A) and 1(B).

On the other hand, with respect to the rib ($N_T$) of the inner race, the guiding surface (Ff) of the rib of the inner race that comes in contact with the end surface (Fr) of the roller is taken to have a convex shape, such that the radius of curvature ($Rf_1$) of the guiding surface (Ff) of the rib on the first principal curvature plane 1 is taken to correspond to ($r_{21}$) in FIGS. 1(A) and 1(B) while the radius of curvature ($Rf_2$) on the second principal curvature plane 2 is taken to correspond to ($r_{22}$) in FIGS. 1(A) and 1(B). In other words, provided that when a vertical line is drawn from the surface of the contact ellipse that is formed at the point of contact between the end surface (Fr) of the roller and the guiding surface (Ff) of the rib, and which includes the contact point (Pc), the vertical line crosses the center axis (Ln) of the inner race of the bearing at the point (Of), the distance from the contact point (Pc) to the intersection (Of) is the radius of curvature ($Rf_1$) of the guiding surface (Ff) on the first principal curvature plane 1.

Figure 2B:
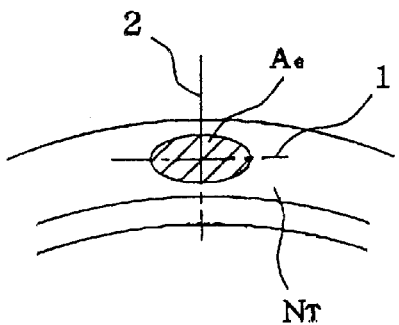
FIG. 2(B) is a view taken along the line IIb—IIb in FIG. 2(A).

In this case, when the size relationship of these radii of curvature ($Rf_1$, $Rf_2$ in the rib, and $Rr_1$, $Rr_2$ in the roller) is:

$$(1/Rf_1)-(1/Rf_2)+(1/Rr_1)-(1/Rr_2)<0 \quad (3)$$

the contact ellipse (Ae), as shown in FIG. 2(B), is long in the circumferential direction of the inner race (N).

Similarly, when either the end surface (Fr) of the roller, or the guiding surface (Ff) of the rib is formed in a conical surface, in other words, when the cord end surface (Fr) of the roller or the guiding surface (Ff) of the rib appears in a straight line on the cross section, that is the second principal curvature plane 2, that passes through the center axis (Ln) of the inner race (N) and through the contact point (Pc) between the end surface (Fr) of the roller and the guiding surface (Ff) of the rib, and when the radius of curvature ($Rr_2$ or $Rf_2$) is taken to be infinity (∞) and satisfies the relationship given above, then the contact ellipse (Ae) becomes long in the radial direction of the inner race (N).

Here, as can be seen from FIG. 1(B) and FIG. 2(B), the shape of the contact ellipse (Ae) appearing on the guiding surface (Ff) of the rib of the inner race extends broader in the circumferential direction (x) of the rib ($N_T$) of the inner race (N) than in the radial direction (y) of the inner race (N). The margin for the protrusion of the contact ellipse (Ae) is larger in the circumferential direction (x) of the inner race (N) than in the radial direction (y) of the inner race (N).

Accordingly, by specifying the curvature of both the end surface (Fr) of the roller and the guiding surface (Ff) of the rib to satisfy equation (3) above to make the contact ellipse longer in the circumferential direction of the inner race (N), it is possible to reduce the edge load which would be produced due to protrusion of the contact ellipse (Ae) from the relief groove of the roller.

Figure 7:
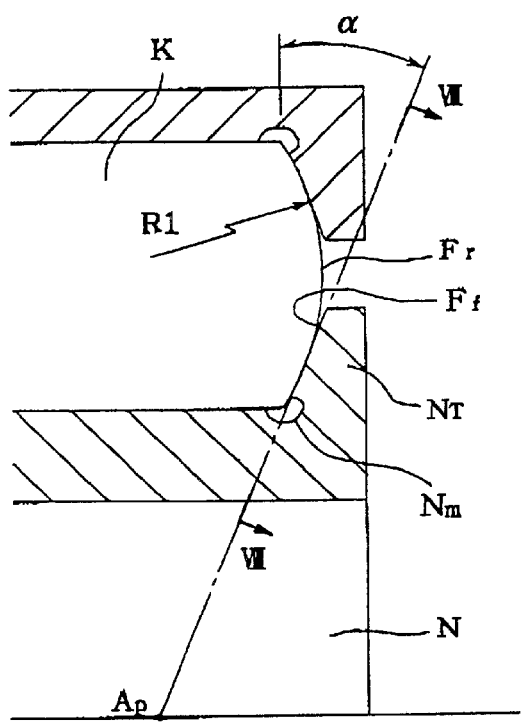
FIG. 7 is a vertical cross sectional schematic view of a conventional cylindrical roller bearing.
Figure 8:
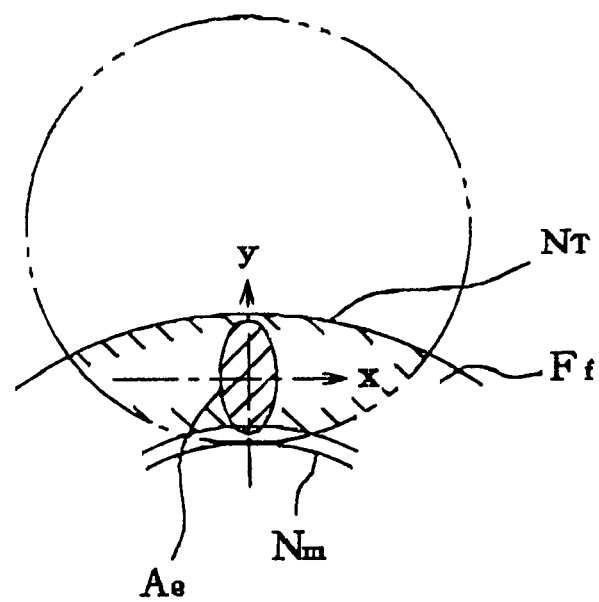
FIG. 8 is a view taken along the line VIII—VIII in FIG. 7.

Incidentally, with respect to the contact area between the guiding surface of the rib formed on the side of the other race and the end surface of the roller, the rib of or adjacent the outer race opens inward at a certain angle (look at FIG. 7), so the guiding surface of the rib of the outer race is a conical and concave surface. Therefore, there is no problem since the contact ellipse of the guiding surface of the rib with the end surface of the roller is naturally longer in the circumferential direction of the outer race. Accordingly, no problem is caused.

The embodiments of the present invention are further explained with reference to the drawings.

Figure 3:
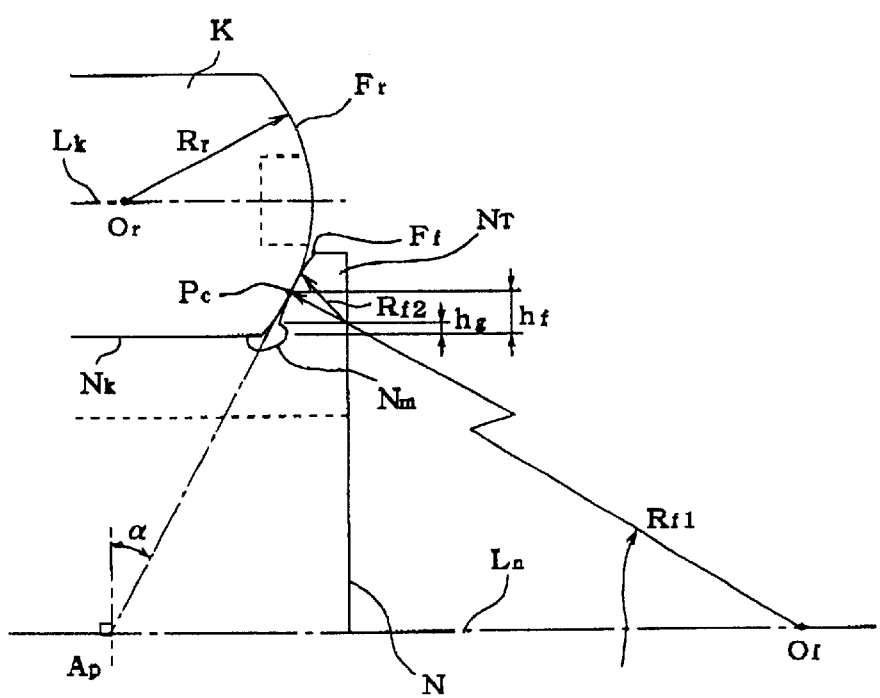
FIG. 3 is a vertical cross sectional schematic view of a first embodiment of the present invention.

FIG. 3 is a drawing of a first embodiment of the invention in which the present invention is applied to a cylindrical roller bearing in which the end surface of the roller has been crowned, and the guiding surface of the rib of the inner race is convex. In other words, the first and second principal curvature planes 1 and 2 are as shown in FIG. 2(A) and FIG. 2(B).

① End surface (Fr) of the roller:

The end surface (Fr) of the roller (K) is formed in a spherical surface, where the radial center (Or) is located on the center axis (Lk) of the roller, and where the radius of curvature ($Rr_1$) on the first principal curvature plane 1 of the end surface (Fr) of the roller, that is the plane that is perpendicular to the page, is equal to the radius of curvature ($Rr_2$) on the second principal curvature plane 2 of the end surface (Fr) of the roller, that is the surface of the page. In other words, $Rr_1 = Rr_2 = Rr$.

② Guiding surface (Ff) of the rib of the inner race:

The guiding surface (Ff) of the rib of the inner race that comes in contact with the end surface (Fr) of the roller is a convex surface, where the radius of curvature ($Rf_2$) of the guiding surface (Ff) is provided on the second principal curvature plane 2 while the radius of curvature ($Rf_1$) of the guiding surface (Ff) is provided on the first curvature plane 1 which is perpendicular to the second curvature plane 2. In other words, the radius of curvature ($Rf_1$) is equal to the distance from the point (Of), where the first principal curvature plane 1 crosses the center axis (Ln) of inner race, to the contact point (Pc).

When equation (3) is applied to this case:

$$(1/Rf_1)-(1/Rf_2)+(1/Rr_1)-(1/Rr_1)<0,$$

where $$Rr_1 = Rr_2,$$

so $$(1/Rf_1)-(1/Rf_1)<0$$

When the shape of the guiding surface (Ff) of the rib of the inner race is such that $Rf_2 < Rf_1$, then as in the case shown in FIG. 2(B), the contact ellipse (Ae) becomes long in the circumferential direction of the inner race (N), and since there is a margin for protrusion in the radial direction, there is little possibility for edge loading to occur.

Figure 4:
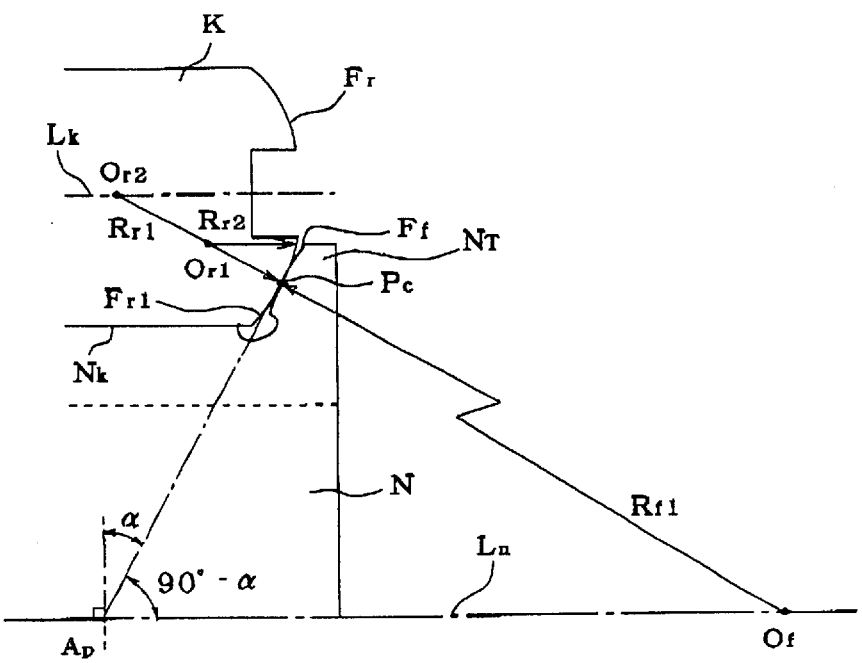
FIG. 4 is a vertical cross sectional schematic view of a second embodiment of the present invention.

FIG. 4 shows a second embodiment of the present invention, in which the present invention is applied to a cylindrical roller bearing where the end surface of the roller has a special crown, and the guiding surface of the rib of the inner race opens outward and is a flat surface. In other words, the first and second principal curvature planes 1 and 2 are specified in the same manner as in the case shown in FIG. 2(A) and FIG. 2(B).

① End surface (Fr) of the roller:

The end surface (Fr) of the roller (K) has a special crown. That is, the radius of curvature ($Rr_2$) is provided in the end surface (Fr) of the roller on the second principal curvature plane 2, and the center ($Or_2$) of that radius of curvature ($Rr_2$) is not located on the center axis (Lk) of the roller. On the other hand, the radius of curvature ($Rr_1$) is provided in the first principal curvature plane 1, and the center ($Or_1$) of that radius of curvature ($Rr_1$) is located on the center axis (Lk) of the roller such that the size relationship of the two radii of curvature is $Rr_2 < Rr_1$.

② Guiding surface (Ff) of the rib of the inner race:

This guiding surface is formed by part of an outward opening conical surface. The conical surface has an apex angle 2×(90 degrees−60) whose axis is the center axis (Ln) of the inner race (N), where the angle α is provided between the guiding surface (Ff) and the plane that is orthogonal to the center axis (Ln). The guiding surface (Ff) of the rib appears in a straight line on the second principal curvature plane 2, and its radius of curvature ($Rf_2$) is infinite, that is $Rf_2 = \infty$, and the radius of curvature ($Rf_1$) of the guiding surface (Ff) is provided on the first principal curvature plane 1, and the center (Of) of the radius of curvature ($Rf_1$) is located on the center axis (Ln) of the inner race.

When equation (3) is applied to this case:

$$(1/Rf_1)-(1/Rf_2)+(1/Rr_1)-(1/Rr_2)<0$$

where $Rf_2 = \infty$ so, $$(1/Rf_1)-0+(1/Rr_1)-(1/Rr_2)<0$$

or in other words:

$$Rr_1 \times Rr_2 + Rf_1 \times Rr_2 - Rf_1 \times Rr_1 < 0$$

When the relationship between the radius of curvature of the end surface (Fr) of the roller and the radius of curvature of the guiding surface (Ff) of the rib of the inner race is;

$$Rr_1 \times Rr_2/(Rr_1 - Rr_2) < Rf_1$$

then the contact ellipse becomes long in the circumferential direction of the inner race (N), and since there is a margin for protrusion in the radial direction, there is little possibility for edge loading to occur.

Figure 5:
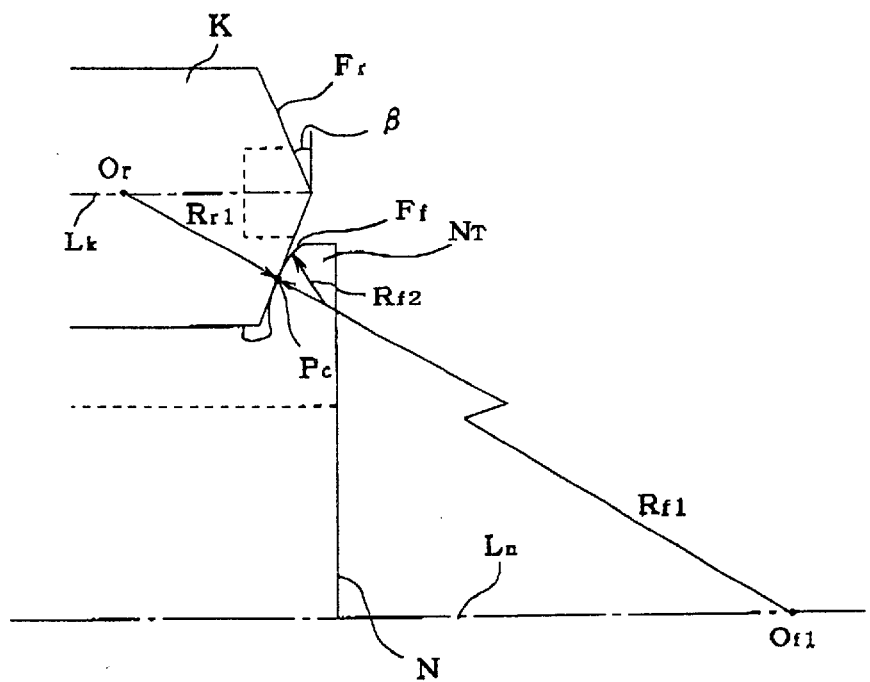
FIG. 5 is a vertical cross sectional schematic view of a third embodiment of the present invention.

FIG. 5 shows a third embodiment of the invention in which the present invention is applied to a cylindrical roller bearing where the end surface of the roller is tapered and the guiding surface of the rib of the inner race is convex. In other words the first and second principal curvature planes 1 and 2 are the same as those in FIG. 2.

① End surface (Rf) of the roller:

This end surface is formed from part of a conical surface having an apex angle, 2×(90 degrees−β) with respect to the center axis (Lk) of the roller (K). The end surface (Fr) of the roller appears in a straight line on the second principal curvature plane 2, and its radius of curvature ($Rr_2$) is infinite, that is $Rr_2 = \infty$, and the radius of curvature ($Rf_1$) is provided on the first principal curvature plane 1 and the center (Or) of the radius of curvature ($Rf_1$) is located on the center axis (Lk) of the roller.

② Guiding surface (Ff) of the rib of the inner race:

The radius of curvature ($Rf_2$) is provided on the second principal curvature plane 2. On the other hand, the radius of curvature ($Rf_1$) is provided on the first principal curvature plane 1, and its center ($Of_1$) is located on the center line (Ln) of the inner race, such that the size relationship of the two radii of curvature is $Rf_2 < Rf_1$.

When equation (3) is applied in this case:

$$(1/Rf_1)-(1/Rf_2)+(1/Rr_1)-(1/Rr_2)<0$$

where $Rr_2 = \infty$, so, $$(1/Rf_1)-(1/Rf_2)+(1/Rr_1)-0<0$$

or $$Rf_2 \times Rr_1 - Rf_1 \times Rr_1 - Rf_1 \times Rf_2 < 0$$

When the relationship between the radii of curvature of the end surface (Fr) of the roller and the radii of curvature of the guiding surface (Ff) of the rib of the inner race is:

$Rf_1 \times Rf_2/(Rf_1-Rf_2) < Rr_1$, the contact ellipse becomes long in the circumferential direction of the inner race (N), and since there is a margin for protrusion in the radial direction, there is little possibility for edge loading to occur.

Figure 6:
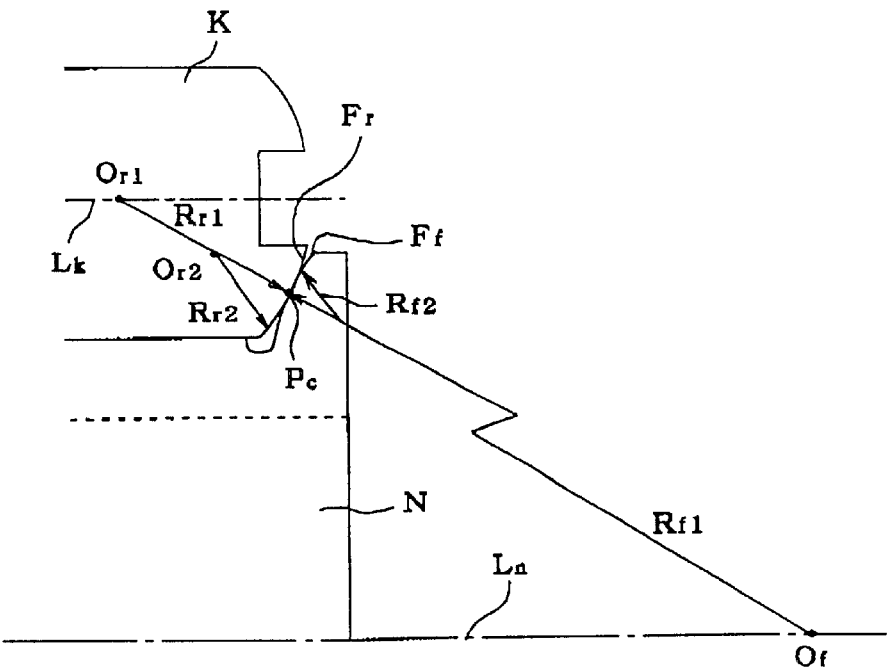
FIG. 6 is a vertical cross sectional schematic view of a fourth embodiment of the present invention.

FIG. 6 shows a fourth embodiment of the present invention in which the present invention is applied to a cylindrical roller bearing where the end surface of the roller has a special crown and the guiding surface of the rib of the inner race is a convex surface. In other words, the first and second principal curvature planes 1 and 2 are specified in the same manner as in the case shown in FIG. 2.

① End surface (Fr) of the roller:

The end surface (Fr) of the roller (K) has a special crown. In other words, the radius of curvature ($Rr_2$) is provided on the end surface (Fr) of the roller on the second principal curvature plane 2, and the center ($Or_2$) of the radius of curvature ($Rr_2$) is not located on the center axis (Lk) of the roller. On the other hand, the radius of curvature ($Rr_1$) is provided on the first principal curvature plane 1, and the center ($Or_1$) of the radius of curvature ($Rr_1$) is located on the center axis (Lk) of the roller, where the size relationship of both of these radii of curvature is $Rr_2 < Rr_1$.

② Guiding surface (Ff) of the rib of the inner race:

The guiding surface (Ff) of the rib of the inner race that comes in contact with the end surface (Fr) of the roller is a convex surface and the radius of the curvature ($Rf_2$) is provided on the second principal curvature plane 2 while the radius of curvature ($Rf_1$) is provided on the first principal curvature plane 1 which is orthogonal to the second principal curvature plane 2.

When equation (3) is applied to this case:

$(1/Rf_1)-(1/Rf_2)+(1/Rr_1)-(1/Rr_2)<0$ in other words;

$Rf_2 \times Rr_1 \times Rr_2 - Rf_1 \times Rr_1 \times Rr_2 - Rf_1 \times Rf_2 \times Rr_2 - Rf_1 \times Rf_2 \times Rr_1 < 0$ or $Rr_1 \times Rr_2(Rf_2-Rf_1) + Rf_1 \times Rf_2(Rf_2-Rr_1) < 0$ When the size relationship between the radius of curvature of the end surface (Fr) of the roller and the radius of curvature of the guiding surface (Ff) of the rib of the inner race is:

$(Rf_2-Rf_1)/(Rf_1 \times Rf_1) < (Rr_1-Rr_2)/(Rr_1 \times Rr_2)$ then the contact ellipse becomes long in the circumferential direction of the inner race (N), and since there is a margin for protrusion in the radial direction, there is a little possibility for edge loading to occur.

EXAMPLES

Next, the comparison calculations that were performed to clarify the effects of the invention are explained.

The cylindrical roller bearing of the present example formed as shown in the first embodiment of the present invention (see FIG. 3), where the end surface (Fr) of the roller has a crown ($Rr_1=Rr_2$) and the guiding surface (Ff) of the rib of the inner race is a convex surface ($Rf_2<Rf_1$).

In the prior art cylindrical roller bearing (A) used in the comparison, the end surface (Fr) of the roller had a crown ($Rr_1=Rr_2$), the guiding surface (Ff) of the rib of the inner race had a conical surface ($Rf_2-\infty$), and the angle α between the generatrix of the conical surface and the line orthogonal to the center axis (Ln) of the roller is 0.275 degrees.

In the prior art cylindrical roller bearing (B) used in the comparison, the angle α designated as mentioned above was 0.263 degrees, which was a little smaller than in the prior art bearing (A), so as to suppress the protrusion of the contact ellipse.

A dimensions of the comparison bearings and the bearing in the present example are shown in Table 1.

TABLE 1

| | Outer diameter × Inner diameter (mm) | Radius of curvature of end surface of the roller (mm) $Rr_1$–$Rr_2$ | Radius of curvature of guiding surface (mm) | | Angle α of guiding surface (degrees) |
|---|---|---|---|---|---|
| | | | $Rf_1$ | $Rf_2$ | |
| Example | 310 × 200 | 2000 | 25000 | 10000 | 0.275 |
| Prior art bearing (A) | 310 × 200 | 2000 | 25000 | ∞ | 0.275 |
| Prior art bearing (B) | 310 × 200 | 2000 | 25000 | ∞ | 0.263 |

When a 30,000 N axial load was applied to these bearings, the size of the contact ellipse that is formed when the end surface (Fr) of the roller comes in contact with the guiding surface (Ff) of the rib of the inner race, the height of the contact point, and the sliding velocity at the center of the contact point are obtained and compared. The radii (major radius, minor radius) of the contact ellipse are calculated from the following equations based on Hertz elastic contact theory.

Major radius: $a=\mu\{(3/E)(1-1/m^2)(Q/\Sigma\rho)\}^{1/3}$

Minor radius: $b=v\{(3/E)(1-1/m^2)(Q/\Sigma\rho)\}^{1/3}$ where;

$\Sigma \rho=(1/Rr_1)+(1/Rr_2)+(1/Rf_1)+(1/Rf_2)$ $\mu, v: \cos \tau=[(1/Rr_1)-(1/Rr_2)+(1/Rf_1)-(1/Rf_2)]/\Sigma\rho$ and where the coefficients used in these functions are:

E: Modules of vertical elasticity of the roller and rib materials
m: Poisson number
Q: Load The values given in Table 2 are used for these coefficients.

TABLE 2

| | Example | Prior art bearing (A) | Prior art bearing (B) |
|---|---|---|---|
| μ | 1.034 | 1.027 | 1.027 |
| v | 0.9675 | 0.9739 | 0.9739 |
| E | 205 (KN/mm²) | | |
| m | 0.3 | | |
| Q | 30 (KN) | | |

The calculation results are shown in Table 3.

TABLE 3

| | Radius of contact ellipse on guiding surface of the rib | | Contact point height (hf) | Sliding speed of contact center |
|---|---|---|---|---|
| | Radial direction of the inner race | Circumferential direction of the inner race | | |
| Example | 2.2 mm | 2.7 mm | 3.5 mm | 1.9 m/sec |
| Prior art bearing (A) | 2.7 mm | 2.3 mm | 3.5 mm | 1.9 m/sec |
| Prior art bearing (B) | 2.7 mm | 2.3 mm | 3.9 mm | 2.2 m/sec |

While the bearing in the example of the present invention, the size of the contact ellipse becomes long in the circumferential direction of the inner race, however it becomes long in the radial direction of the inner race for the prior art bearings (A and B).

In both the bearing of the Example and the prior art bearing (A), the height (hf) of the contact point (Pc) from the raceway surface (Nk) of the inner race is 3.5 mm, and the height (hg) of the relief groove (Nm) is 1.2 mm, so that space from the contact point (Pc) to the top of the relief groove (Nm) is 3.5 mm−1.2 mm=2.3 mm. In the bearing of the Example, where the radius of the contact ellipse in the radial direction of the inner race is 2.2 mm, there is a margin equal to the differences, 0.1 mm, for protrusion of the contact ellipse, so there is not problem with edge loading.

On the other hand, the radius of the contact ellipse in the radial direction of the inner race of the prior art bearing (A) is 2.7 mm so there is 0.4 mm protrusion, and there is the possibility of edge loading on the boundary surface between the contact ellipse and the relief groove, or on the boundary surface between the contact ellipse and the outer diameter portion of the rib. For the prior art bearing (B), the angle α between the guiding surface (Ff) of the rib of the inner race, defining part of the conical surface, and the plane that orthogonally crosses the center axis of the inner race is somewhat smaller than in the case of the prior bearing (A), and the height (hf) of the contact point (Pc) is 3.9 mm, which is 0.4 mm larger than that of the prior bearing (A), so there is not protrusion of the contact ellipse to the relief groove (Nm), however, the sliding speed in the center of the contact ellipse is 15% greater than that of the bearing in the Example and prior art bearing (A), so there is a large possibility of a rise in temperature of the bearing, and well as scuffing or seizure of the guiding surface of the rib of the inner race.

As described above, with the present invention, the major radius of the contact ellipse in the area of relatively sliding contact between the guiding surface of the rib of or for the inner race and the end surface of a cylindrical rollers in a cylindrical roller bearing is directed in the circumferential direction of the inner race, so that it is possible to reduce the edge load acting on the area of contact between the rib and cylindrical rollers, and also to effectively prevent damage to the cylindrical rollers or races.

What is claimed is:

1. A cylindrical roller bearing comprising rollers having an end surface and an inner race having a rib with a guiding surface, such that the end surface of the rollers comes in contact with the guiding surface of the rib with a contact ellipse formed therebetween, at least one of the end surface of the rollers and the guiding surface of the rib having a curved, convex surface, and provided that a second principal curvature plane passes through the center axis of the inner race and the center of the contact ellipse, that a first principal curvature plane perpendicularly crosses both of the second principal curvature plane and the contact ellipse and extends through the center of the contact ellipse, that the cross section of the end surface of the rollers appearing in the second principal curvature plane has a second principal radius of curvature ($Rr_2$) while the cross section of the end surface of the rollers appearing in the first principal curvature plane has a second principal radius of curvature ($Rr_1$), and that the cross section of the guiding surface of the rib appearing in the second principal curvature plane has a second principal radius of curvature ($Rf_2$) while the cross section of the guiding surface of the rib appearing in the first principal curvature plane has a first principal radius of curvature ($Rf_1$), the relation of $(1/Rf_1)-(1/Rf_2)+(1/Rr_1)-(1/Rr_2)<0$ is satisfied, wherein when there is no curvature, the principal radius of curvature is ∞, and $1/\infty=0$.

* * * * *